March 31, 1953 R. F. HARDWICK 2,633,457
BASING CEMENT
Filed March 19, 1949
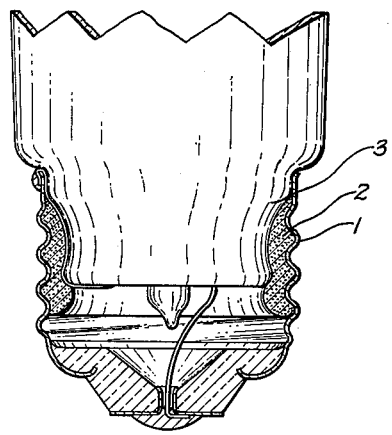
Inventor:
Robert F. Hardwick,
by Vernet C. Kauffman
His Attorney.

UNITED STATES PATENT OFFICE 2,633,457

BASING CEMENT

Robert F. Hardwick, Euclid, Ohio, assignor to General Electric Company, a corporation of New York Application March 19, 1949, Serial No. 82,364

5 Claims. (Cl. 260—25)

This invention relates to a cement used to form a bond between glass and another material, such, for example, as between glass and metal in electric devices, such as lamps, radio tubes, and similar devices.

The conventional basing cement ordinarily employed to join a metal base to a glass bulb of an electric lamp is entirely satisfactory over a limited temperature range but it loses its adhesive properties when heated above a certain temperature, thus limiting its application. My invention greatly extends this useful temperature range and makes it possible to use the inexpensive cemented base in many more instances and in place of certain relatively expensive "mechanical base" constructions.

An object of this invention is to provide a basing cement which will withstand high temperatures without losing its adhesive properties. Other objects and advantages of my invention will appear from the following description of species thereof.

Referring to the drawing, the single figure is an enlarged partly sectional, fragmentary view of the base end of an incandescent electric lamp embodying my invention.

A basing cement, as well known in the art, is composed of an inert filler material, an insulating binder, and a processing agent or vehicle. Typical fillers which have been previously used are marble flour, ground mineral barytes, titanium dioxide and asbestos. The binder material may be shellac, rosin, various synthetic resins, etc., or mixtures thereof. Various processing agents can be used, the most common of which is alcohol. It is not uncommon to add a small amount of a curing indicator such as Malachite green to the cement. This organic dye changes color upon heating, and the amount of color change thus serves to indicate the degree of heat applied to the lamp in the curing process.

The synthetic resin preferably, though not exclusively employed in basing cements is one comprising a phenolic resin, e. g., a phenol-furfural resin. A composition comprising the product of condensation of phenol, furfural, and formaldehyde to which has been added dibutyl phthalate, hexamethylene tetramine, benzoyl peroxide and wood flour, and known commercially as a "Durite" resin (manufactured by the Durite Plastics Division of The Borden Company), is used extensively as a binder in basing cements for electric lamps.

It is desirable that a basing cement have certain special properties. It has been found that by varying the proportions of the well-known ingredients different qualities may be given the resultant cement. For example, a binder composed of shellac and rosin has good resistance to high humidity, but while still hot has very little adhesive power. Using "Durite" and rosin imparts good "hot strength" to the cement but it has poor humidity resisting qualities. A combination of "Durite," rosin, and shellac, in the correct proportions, results in a good basing cement which is used extensively and has but one limitation, that is, it breaks down at elevated temperatures.

I have found that adding a proportion of a composition comprising a silicone resin, preferably in the form of a solution, to this well-known basing cement substantially increases the thermal resistance of the cement. For example, a typical cement composed of "Durite," rosin, shellac and alcohol may be used successfully in basing a projection lamp having a useful life of about 50 hours provided the temperature of the cement during lamp operation is not higher than about 275° C., or in basing a bake-oven lamp having a 1000 hour life provided the temperature of the cement does not exceed about 175° C. during the operation of the lamp. By adding to this cement a solution comprising a silicone resin and a solvent the temperature of the cement on the projection lamp may be raised to more than 450° C. and on the bake-oven lamp to between about 230 to 260° C. without causing the cement to lose its adhesive properties during the useful operating life of the lamp.

In the preferred form of my invention the silicone resin solution comprises a 60% methyl phenyl polysiloxane resin in a solvent comprising xylene. The polysiloxane is made by hydrolyzing a mixture of chlorosilanes comprising 91.7% (by weight) of mixed dimethyldichlorosilane and trimethylchlorosilanes with 8.3% (by weight) of phenyltrichlorosilane. It is to be understood that although this silicone resin is preferred in the practice of my invention, there are other heat-curable silicone resins which may be employed in its place without departing from the scope thereof. Additional examples of silicone resins which may be employed are found disclosed and claimed in Rochow Patents 2,258,218–222 issued October 7, 1941, and assigned to the same assignee as the present invention.

Other solvents for the silicone resin, as, for instance, toluene, N-propanol, etc., instead of xylene, may be employed without changing the action of the solution.

The following formulae are given as examples of cements made according to my invention:

*Example A*

| | | |
|---|---|---|
| "Durite" | lbs | 7 |
| Rosin | lbs | 3.5 |
| Shellac (dry) | lbs | 4.5 |
| Marble flour | lbs | 85 |
| Alcohol—denatured | c. c. | 4400 |
| Silicone resin solution | lbs | 20 |

*Example B*

| | | |
|---|---|---|
| "Durite" | lbs | 8 |
| Rosin | lbs | 3.5 |
| Marble flour | lbs | 83 |
| Malachite green | grams | 12 |
| Alcohol | c. c. | 1865 |
| Silicone resin solution | lbs | 18 |

*Example C*

A conventional cement of the following composition is first prepared:

| | | |
|---|---|---|
| "Durite" | lbs | 1¾ |
| Rosin | grams | 892 |
| Shellac | do | 2016 |
| Marble flour | lbs | 42.5 |
| Malachite green | grams | 3.0 |
| or | | |
| Calcozine green | do | 2.0 |
| Alcohol—denatured | c. c. | 2000 |

Then 5.5 pounds of the above conventional cement is mixed with .75 lb. of silicone resin solution and 0.5 lb. of marble flour is then added.

The proportion of silicone resin solution may be varied considerably from the 20% of the combined weight of all solids in the formulae. It has been reduced to 10%, with a corresponding reduction in heat-resisting properties, and can be raised to as high as 50% before practical difficulties in cement viscosity are encountered. On a weight basis from 5 to 35 per cent silicone resin based on the weight of the balance of the ingredients in the basing cement may be employed.

The drawing illustrates a use of my invention as applied to incandescent lamps. The cement 2 made according to my formula is placed around the inside of the base 1. At this time the cement is cold and resembles putty in its consistency. The glass bulb 3 is then positioned in the base and the curing operation begun. In the process of curing or setting the cement, it is heated for a period of approximately 40 seconds and reaches a temperature of about 200° C. This combination of time and temperature is sufficient to remove the alcohol from the cement and cause certain chemical reactions typical to a thermo-setting cement to take place. This time and temperature, however, is insufficient to completely cure the silicone resin part of the cement and it remains somewhat tacky. The silicone resin is cured finally in the initial stages of normal lamp operation.

A basing cement made according to my formula using 20% (by weight) of a 60% solids silicone resin solution will retain its adhesive properties up to a temperature of 230–260° C. for 1000 hours and longer. By increasing the proportion of silicone resin solution the breakdown temperature can be increased considerably.

From the foregoing it will be readily appreciated by those skilled in the art that I have provided for use in the arts generally and particularly in the art of securing glass bulbs and metal bases together, a high temperature resistant cement which may be cured in two stages to facilitate the manufacture of devices including these or similar elements. For example, in the manufacture of incandescent lamps by high speed machinery the new cement may be used in place of the usual cement which contains no silicone resin without modification of the basing machine or its speed or mode of operation. The usual time and temperature conditions are sufficient to cure the new cement to the extent that the based lamp may be removed from the machine and handled in the usual manner without the base loosening from the bulb. The final curing of the new cement occurs during operation of the lamp and increases the strength of the cement.

What I claim as new and desire to secure by Letters Patent of the United States is:

1. A basing cement for bonding metal bases to glass envelopes of electric devices containing marble flour, alcohol, rosin, phenol-furfural resin including hexamethylenetetramine and an approximately 60% solids methyl phenyl polysiloxane heat-curable resin solution, said resin solution being present in the proportion of approximately 10 to 50 per cent by weight of the combined weight of all the solids in the cement.

2. A basing cement for bonding metal bases to glass envelopes of electric devices containing marble flour, alcohol, rosin, phenol-furfural resin including hexamethylenetetramine and an approximately 60% solids methyl phenyl polysiloxane heat-curable resin solution, said resin solution being present in the proportion of approximately 20 per cent by weight of the combined weight of all the solids in the cement.

3. A basing cement for bonding metal bases to glass envelopes of electric devices and containing the following ingredients in substantially the proportions stated:

| | | |
|---|---|---|
| Phenol-furfural resin including hexamethylenetetramine | lbs | 7 |
| Rosin | lbs | 3.5 |
| Dry shellac | lbs | 4.5 |
| Marble flour | lbs | 85 |
| Denatured alcohol | c. c. | 4,400 |
| Silicone resin solution | lbs | 20 | in which the silicone resin solution is a 60% solids methyl phenyl polysiloxane heat-curable resin solution.

4. A basing cement for bonding metal bases to glass envelopes of electric devices and containing the following ingredients in substantially the proportions stated:

| | | |
|---|---|---|
| Phenol-furfural resin including hexamethydenetetramine | lbs | 8 |
| Rosin | lbs | 3.5 |
| Marble flour | lbs | 83 |
| Malachite green | grams | 12 |
| Alcohol | c. c. | 1,865 |
| Silicone resin solution | lbs | 18 | in which the silicone resin solution is a 60% solids methyl phenyl polysiloxane heat-curable resin solution.

5. A basing cement for bonding metal bases to glass envelopes of electric devices and containing the following ingredients in substantially the proportions stated:

| Phenol-furfural resin including hexamethylenetetramine | lbs | 1¾ |
|---|---|---|
| Rosin | grams | 892 |
| Shellac | do | 2,016 |
| Marble flour | lbs | 42.5 |
| Denatured alcohol | c. c. | 2,000 | to 5.5 lbs. of which has been mixed 0.75 lb. of silicone resin solution and 0.5 lb. of marble flour and in which the silicone resin solution is a 60% solids methyl phenyl polysiloxane heat-curable resin solution.

ROBERT F. HARDWICK.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,258,222 | Rochow | Oct. 7, 1941 |
| 2,389,491 | Dunlap et al. | Nov. 20, 1945 |
| 2,466,434 | Johannson | Apr. 5, 1949 |
| 2,502,286 | Sowa | Mar. 28, 1950 |

FOREIGN PATENTS

| Number | Country | Date |
|---|---|---|
| 18,393 | Australia | July 11, 1935 |

OTHER REFERENCES

Official Digest, "Organo-Silicon Compounds," pages 424–441, November 1945.